US006566466B1

(12) United States Patent
Zajaczkowski

(10) Patent No.: US 6,566,466 B1
(45) Date of Patent: May 20, 2003

(54) METHOD FOR PRODUCTION OF ACRYLATE POLYMER WITH LIQUID DILUENT

(75) Inventor: Michael J. Zajaczkowski, York, PA (US)

(73) Assignee: Adhesives Research, Inc., Glen Rock, PA (US)

( * ) Notice: Subject to any disclaimer, the term of this patent is extended or adjusted under 35 U.S.C. 154(b) by 0 days.

(21) Appl. No.: 10/197,409

(22) Filed: Jul. 18, 2002

(51) Int. Cl.$^7$ .................................................. C08F 2/00
(52) U.S. Cl. ........................ 526/204; 526/209; 526/217; 526/236; 526/304; 526/307; 526/307.7; 526/320; 526/328.5; 526/329.2; 526/329.6
(58) Field of Search ................................. 526/204, 209, 526/217, 236, 304, 307, 307.7, 320, 328.5, 329.2, 329.6

(56) References Cited

U.S. PATENT DOCUMENTS

| 4,619,979 | A | | 10/1986 | Kotnour et al. | |
|---|---|---|---|---|---|
| 6,211,320 | B1 | * | 4/2001 | Dershem et al. | ......... 526/329.1 |
| 6,391,993 | B1 | * | 5/2002 | Attarwala et al. | .......... 526/261 |
| 6,433,097 | B1 | * | 8/2002 | Nixon et al. | ................. 525/273 |

\* cited by examiner

*Primary Examiner*—Helen L. Pezzuto
(74) *Attorney, Agent, or Firm*—Birch, Stewart, Kolasch & Birch, LLP

(57) ABSTRACT

A method is provided for the production of a graft copolymer or acrylate polymer blend in the presence of at least one liquid diluent comprising the steps of (1) providing a reaction mixture of at least one A monomer consisting of a monomeric (meth)acrylic acid ester of a non-tertiary alcohol in admixture with at least one liquid diluent which is non-reactive under conditions of free radical polymerization employed, optionally at least one B monomer different from said A monomer, optionally at least one polymeric graft moiety C having a $T_g$ greater than 20° C., and optionally at least one polymeric graft moiety D containing repeat hydrophilic units; (2) forming an acrylate polymer in the presence of the diluent by free radical polymerization under conditions whereby the at least one liquid diluent is non-reactive; and (3) subsequently curing said diluent, and wherein the at least-one diluent is selected from the group consisting of:

(a) a ring-opening monomer diluent producing a polymer having a $T_g<20°$ C., and (b) mixtures of said ring-opening monomer diluent and a multifunctional liquid polymer having a $T_g<20°$ C.

31 Claims, No Drawings

_US 6,566,466 B1_

METHOD FOR PRODUCTION OF ACRYLATE POLYMER WITH LIQUID DILUENT

BACKGROUND OF THE PRESENT INVENTION

The present invention is directed to a novel method for the, production of a graft copolymer or acrylate polymer blend in the presence of at least one liquid diluent.

It is increasingly becoming desirable to avoid the use of a solvent in the production of polymers. Environmental concerns as well as the need to produce residual solvent-free products for use in medical applications may necessitate the use of solvent-free reaction mixtures in polymerization reactions. It is known to form an acrylate polymer by free radical polymerization in the presence of a diluent such as toluene, hexane, pentane, acetone, methyl ethyl ketone, methanol, t-butyl alcohol, and isopropanol. See, for example, U.S. Pat. No. 4,619,979. However, it would be desirable to employ a diluent which can subsequently be incorporated into the resulting material by formation of either a graft copolymer, an interpolymer or blend.

OBJECTS AND SUMMARY OF THE PRESENT INVENTION

It is accordingly an object of the present invention to provide a novel method for the production of an acrylate polymer optionally in the absence of a solvent.

It is also another object, of the present invention to provide a novel method for the production of an acrylate polymer optionally in the absence of a solvent and which exhibits pressure sensitive adhesive properties.

It is also an object of the present invention to provide a blend of an acrylate polymer and a crosslinked diluent.

It is also an object of the present invention to provide an interpolymer formed by the method of the present invention.

It is further an object of the present invention to provide a graft copolymer formed by the method of the present invention.

In accordance with the present invention, there is thus provided a method for the production of an acrylate polymer in the presence of at least one liquid diluent comprising the steps of:

(1) providing a reaction mixture comprising at least one A monomer consisting of a monomeric (meth)acrylic acid ester of a non-tertiary alcohol together with said liquid diluent, optionally at least one B monomer different from said A monomer, optionally at least one polymeric graft moiety C having a $T_g$ greater than 20° C., and optionally at least one polymeric graft moiety D containing repeat hydrophilic units;

(2) forming an acrylate polymer in the presence of said diluent by free radical polymerization under conditions whereby the at least one diluent is non-reactive; and (3) subsequently curing said diluent, and wherein said at least one diluent is selected from the group consisting of:

(a) a ring-opening monomer diluent producing a polymer having a $T_g$ <20° C., and (b) mixtures of said ring-opening monomer diluent and a multifunctional liquid polymer having a $T_g$ <20° C.

DETAILED DESCRIPTION OF THE INVENTION

The present invention is directed to a method for the production an acrylate. polymer in the presence of at least one liquid diluent, with the diluent subsequently being incorporated into the acrylate polymer product by subjecting the diluent to reactive conditions. By way of definition, the acrylate polymer initially formed by the method of the present invention may comprise a homo- or copolymer, and which may optionally include polymeric graft moieties. Preferably, the resulting polymer product exhibits pressure sensitive adhesive properties.

The initial acrylate polymer comprises the reaction product of at least one acrylate A monomer, optionally a B monomer different from said A monomer, optionally a polymeric graft moiety C having a $T_g$ greater than 20° C., and optionally a polymeric graft moiety D containing repeat hydrophilic units different from polymeric graft moiety C.

The at least one A monomer comprises a monomeric (meth)acrylic acid ester of a non-tertiary alcohol where the alcohol portion has from 1 to 30 carbon atoms. Exemplary A monomers include but are not limited to esters of acrylic acid or methacrylic acid with non-tertiary alcohols such as 1-butanol, 1-pentanol, 2-pentanol, 3-pentanol, 2-methyl-1-butanol, 1-methyl-1-pentanol, 2-methyl-1-penitanol, 3-methyl-1-pentanol, 2-ethyl-1-butanol, 3,5,5-trimethyl-1-hexanol, 3-heptanol, 2-octanol, 1-decanol, 1-dodecanol, etc. Exemplary A monomers formed from an alcohol having at least 12 carbon atoms include but are not limited to lauryl acrylate ($C_{12}$), tridecylacrylate ($C_{13}$), myristyl acrylate ($C_{14}$), palmityl acrylate ($C_{16}$) and stearyl acrylate ($C_{18}$). Such monomers are well-known to those skilled in the art. The least one A monomer component (if more than one A monomer is present) will preferably exhibit an average number of carbon atoms in the alcohol portion of the total acrylic or (meth)acrylic acid esters of from 4 to 16.

One or more optional polymerizable B monomers different from the A monomer may be incorporated in the copolymer which B monomer(s) is copolymerizable with the A monomer. Such additional B monomer(s) may be either hydrophilic or hydrophobic.

Exemplary optional B monomers include vinyl monomers having at least one nitrogen atom. Such monomers (each of which exhibit a $T_g$ of >20° C.) include but are not limited to N-mono-substituted acrylamides such as acrylamide, methacrylamide, N-methylacrylamide, N-ethylacrylamide, N-methylolacrylamide, N-hydroxyethylacrylamide, and diacetone acrylamide; N,N-disubstituted acrylamides such as N,N-dimethylacrylamide, N,N-diethylacrylamide, N-ethyl-N-aminoethyl acrylamide, N-ethyl-N-hydroxyethylacrylamide, N,N-dimethylolacrylamide, and N,N-dihydroxyethylacrylamide, etc.

Other optional B monomers may include, for example, various vinyl monomers such as (meth)acrylic acid, itacoriic acid, crotonic acid, methoxyethyl (meth)acrylate, ethyoxyethyl (meth)acrylate, glycerol (meth)acrylate, hydroxyethyl methacrylate; hydroxypropyl methacrylate, beta-carboxyethyl acrylate, vinyl pyrrolidone, vinyl caprolactam and caprolactam acrylate. One or more B monomers may be employed. Hydroxy-containing B monomers if present provide reactive sites to assist in the crosslinking of or reaction between the acrylate polymer and the diluent during the curing step.

The optional graft polymeric moiety C has a $T_g$ greater than 20° C. Graft polymeric moiety C has the formula X—Z wherein X is a group copolymerizable with monomers A and B or capable of attachment to copolymerized A and B monomers and Z is a polymeric graft moiety having a $T_g$ greater than 20° C. The Z moiety is essentially unreactive under copolymerization conditions.

More specifically, the X moiety is an unsaturated polymerizable moiety the composition of which is not critical. The X moiety may, for example, when intended to be copolymerizable with monomers A and B, simply be a vinyl group of the formula $CHR=CR^1—$ where R is hydrogen or COOH and $R^1$ is hydrogen or alkyl such as methyl. Other exemplary X moieties include but are not limited to methacryloyl, maleoyl, itaconoyl, crotonoyl, unsaturated urethane moiety, methacrylamido and moieties of the formula $CH_2=CHCH_2O—$.

The X moiety may comprise an amine or alcohol moiety (such as a monohydroxyl or monoamine moiety) which permits attachment of the macromer to a suitable functionality on previously-polymerized monomers A and B. For instance, the hydroxyl moiety can serve as a terminal reactive group by reaction with suitable moieties on the polymer backbone resulting from the use of monomers such as isocyanate-substituted (meth)acrylic acid, (meth)acrylic acid anhydride, etc.

A variety of functional groups may be employed to attach the graft Z to the polymer backbone.

Exemplary functional groups include but are not limited to

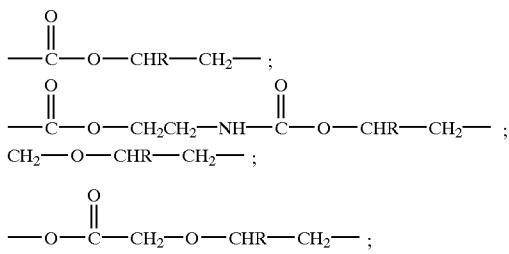

and $—OCH_2CH_2—O—CHR—CH_2$, where R is a hydrogen atom or a lower alkyl group.

With regard to the optional polymeric graft moiety C, U.S. Pat. Nos. 3,786,116; 3,842,057; 3,842,058; 3,842,059; 3,862,098; 3,862,101, 3,862,102 and 4,554,324 disclose polymerizable macromers which are suitable for use as graft moieties on a backbone polymer as defined.

Preferably, the polymeric moiety C is formed from a vinyl aromatic monomer such as styrene, alpha-methylstyrene, indene and p-tert-butylstyrene. However, the polymeric moiety Z may also be formed from vinyl toluene, acenaphthalene, acrylonitrile and methacrylonitrile; organic isocyanates including lower alkyl, phenyl, lower alkyl phenyl and halophenyl isocyanates; organic diisocyanates including lower alkylene, phenylene, and tolylene diisocyanates; lower alkyl and allyl acrylates and methacrylates, including methyl, t-butyl acrylates, and methacrylates; lower olefins, such as ethylene, propylene, butylene, isobutylene, pentene, hexene, etc.; vinyl esters of aliphatic carboxylic acids such as vinyl acetate, vinyl propionate, vinyl octoate, vinyl oleate, vinyl stearate, vinyl benzoate, vinyl lower alkyl ethers; conjugated dienes such as isoprene and butadiene; and vinyl unsaturated amides such as acrylamide, methylacrylamide, N,N-di(lower alkyl) acrylamides such as N,N-dimethylacrylamide.

The selection of the specific,polymerizable monomer for the polymer graft is not critical, since as the above listing suggests, a wide variety of monomers (and the resulting polymeric moieties) can be used with success as a polymeric graft in the claimed composition which meet the minimum $T_g$ requirement.

The molecular weight of the graft polymeric moiety C is preferably sufficient to result in the formation of a "phase-separated" graft copolymer composition. Generally, but not necessarily, the molecular weight of the graft polymeric moiety will be within the range of from about 2,000 to 60,000, and will preferably range from about 2,000 to 13,000.

The optional graft polymeric moiety D also forms polymeric side chains on the copolymer. The graft polymeric moiety D contains repeat hydrophilic units.

The graft polymeric moiety D may be represented by the formula $X—(Y)_p—Z—R$. X is as defined above and is a moiety copolymerizable with monomers A and B or, in the alternative, capable of attachment to polymerized monomers A and B, Y is a divalent linking group, Z is a homo- or Copolymeric moiety essentially unreactive at copolymerization conditions containing repeat hydrophilic units, R is a terminal group, and p is 0 or 1.

A preferred Y divalent linking group is

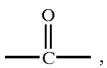

or a linking group which incorporates such a moiety.

Additional Y linking groups which may be employed in connection with the present invention include but are not limited to the following moieties:

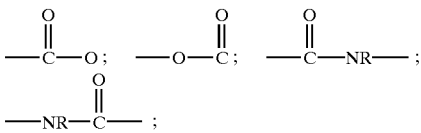

$—CH_2—O—CR_2—CH_2—$; $—O—CR_2—O—CR_2—CH_2—$; $—OCH_2CH_2—O—CR_2—CH_2—$; and

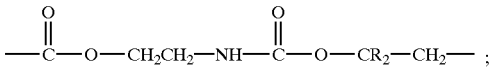

where R is hydrogen, alkyl or phenyl. Obviously, the presence of the Y linking group is optional in the event the moiety includes a functionality which enables the Z moiety to react with the X moiety. As the incorporation of macromolecular moieties in copolymers is well understood by those skilled in the art, the choice of a suitable X and Y moiety for use in the present invention may be readily made upon practice of the present invention. See, for example, the discussion in U.S. Pat. Nos. 3,786,116; 3,832,423; 3,842,058; 3,842,059; 3,842,146; and 4,554,324, herein incorporated by reference.

The Z moiety is a moiety having repeat hydrophilic units preferably selected from the group consisting of (but not limited to) a polyalkylene oxide radical such as a polypropylene or polyethylene oxide radical, a polyethyloxazoline radical such as a radical of poly(2-ethyl-2-oxazoline), polyacrylic acid radical, polyvinyl alcohol radical, polyvinylpyrrolidone radical, polyester(meth)acrylate radical, polyvinyl caprolactam radical, polymethylvinyl ether radical or mixtures thereof. Exemplary D macromers formed from such radicals include but are not limited to ethoxylated or propoxylated hydroxy($C_{1-5}$)alkyl meth(acrylate), polymethyl vinyl ether mono(meth)acrylate and beta-carboxyethyl acrylate. The molecular weight of the macromer D used in the present invention is not critical but will generally range from about 300 to about 50,000, and preferably from about 300 to 3,000.

The Z moiety is preferably comprised solely of one or more hydrophilic monomer radicals. However, the Z moiety may also be a copolymer of hydrophilic and hydrophobic monomers. Desirably,, any non-hydrophilic portion employed in the D macromer is present in an amount of 50% or less based on the weight of the macromer.

The graft polymeric moiety D is preferably represented by the formula:

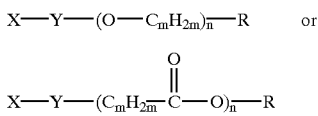

wherein X and Y are as defined above and R represents a terminal group; and in which m is an integer of from 2 to 6, and n ranges up to 300.

More specifically, macromer D may be an ethoxylated or propoxylated hydroxy($C_{1-5}$)alkyl acrylate represented by the formula:

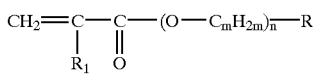

wherein $R_1$ is hydrogen or $C_{1-5}$ alkyl and R is a terminal group. Preferably, m is 2 or 3 and n is 4 to 30, and R is H, OH, $C_{1-5}$ alkyl, or nonyl-phenol.

Alternatively, macromer D may advantageously comprise a 2-carboxy($C_{1-5}$)alkyl acrylate of the formula:

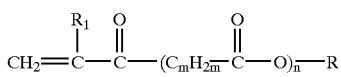

where $R_1$ is hydrogen or $C_{1-5}$ alkyl and R is a terminal group. Preferably, m is 2 or 3 and n is 4 to 30, and R is H, OH, $C_{1-5}$ alkyl or nonyl-phenol.

Of course, macromer D may incorporate mixtures of polyether and polyester repeat units with advantage in a variety of ratios. Such ratios are non-critical to practice of the present invention.

The graft polymeric moieties C and D may employ a variety of terminal groups R. While the terminal group may typically be OH or $C_{1-5}$ alkyl, it may be desirable to select a terminal group based on the functional character of the terminal group. For instance, suitable terminal groups include but are not limited to (1) acid/ionic groups such as carboxyl, phosphate or sulfate groups, (2) hydrophobic groups such as lower alkyl, phenyl or substituted phenyl, and (3) hydrophilic groups such as hydroxyl or amine groups.

Polymeric compositions are known which are comprised of backbone polymers having grafted thereto pendant polymeric moieties. The type of backbone polymer and graft polymeric moiety employed varies depending upon the desired characteristics of the end product. See for example, U.S. Pat. Nos. 3,786,116; 3,832,423; 3,842,146; 3,862,077; 3,8795494; 3,928,255; 3,989,768; 4,085,168; 4,551,388; 4,554,324; 4,656,213; 4,693,776; 4,732,808; 4,871,812; 5,352,516 and 5,573,778. The presence of hydrophilic graft macromers is disclosed in commonly-assigned U.S. Pat. Nos. 5,395,907; 5,508,367; 5,565,268; 5,726,250; and 5,731,387.

Preferably, the A monomer is present in the acrylate polymer in an, amount of from 20 to 95 percent by weight, the optional B monomer is present in an amount of from 3 to 65 percent by weight, the optional graft polymeric moiety C is present in an amount of from 2 to 30 percent by weight, and the optional graft polymeric moiety D is present in an amount of from 5 to 60 percent by weight, based on the total weight of the respective components A, B, C and D in the polymerization mixture.

As noted above, the acrylate-polymer of the present invention may be prepared by free radical-initiated copolymerization of components A and optionally B, C and D in the presence of the diluent and a suitable catalyst such as peroxides, diazo compounds, etc. known to those skilled in the art. Such polymerization may be conducted in the substantial absence of a solvent and in the presence of the at least one diluent. Suitable polymerization temperatures range from about 20° C. to about 150° C. for periods of time of from 2 to 24 hours until the desired degree of conversion occurs. The conditions of free radical polymerization which are employed are selected so that the diluent (s) does not react with the acrylate monomer (or the components B, C and D) either by ring-opening or reaction with functional terminal groups. This can generally be accomplished by employing reaction temperatures below those which will result in either ring-opening or reaction of functional groups on the diluent. It is also preferable to avoid use of catalysts or reagents in the free radical polymerization step that will promote the premature reaction of the reactive diluent.

The reactants may also be polymerized by radiation curing in the presence of the diluent. In the present invention the term "radiation" means light rays, such as ultraviolet rays, or ionizing radiation such as an electron beam. Preferably, ultraviolet lamps are used which emit UV light in the wavelength range absorbed by the particular photoinitiator used. Several different lamps which are commercially available may be used. These include medium pressure mercury lamps and low intensity fluorescent lamps, each having various emission spectra and emission maxima between 280 and 400 nanometers. Commercially available fluorescent black lights with a maxima at 351 nanometers and 90% of the emissions between 300 and 400 nanometers (nm) may be utilized. In general, the total radiation dose should be between about 400–600 milliJoules/$cm^2$. It is preferable that at least about 75 percent of the radiation be between 300 and 400 nm.

If the reaction is to be cured by exposure to nonionizing radiation, such as ultraviolet radiation, then a photoinitiator is also present in the composition. The photoinitiator, if present, is employed at a concentration of from about 0.1 to 10 weight percent, preferably from 0.5 to 5 weight percent based on the total weight of the radiation curable composition.

The photoinitiators which may be used are well known to those skilled in the art. Such photoinitiators include but are not limited to 2,2-diethoxyacetophenone, 2,2-dimethoxyphenoxyacetophenone, 2- or 3- or 4-bromoacetophendne, 3- or 4-allylacetophenone, 2-acetonaphthone, benzaldehyde, benzoin, the allyl benzoin ethers, benzophenone, benzoquinone; 1-chloroanthraquinone, Michler's Ketone, p-methoxybenzophenone, dibenzosuberone, 4,4-dichlorobenzophenone, 1,3-diphenyl-2-propanone, fluorenone, 1,4-naphthyl-phenylketone, 2,3-pentanedione, propiophenone, chlorothioxanthone, 2-methylthioxanthone xanthone or mixtures thereof.

It is well known that acrylate polymers may be prepared by radiation curing of monomer admixtures. See, for example, U.S. Pat. Nos. 4,181,752; 4,379,201; 4,421,822; 4,513,039; 4,522,870; 4,587,313; 4,665,106; 5,183,833; 4,737,559; 5,302,629; 5,462,977; 5,536,759; 5,552,451;

5,618,899 and 5,683,798. Attempts have also been made to provide reinforced pressure sensitive adhesives by incorporating reinforcing macromers in the radiation curable composition. See, for example, PCT/US97/09601 and WO94/13750.

Once polymerized in the presence of the at least one liquid diluent (which does not react under the conditions of free radical polymerization of the reactants A, B, C, and D) to yield a composition comprised of the acrylate polymer in admixture with the unreacted diluent, the composition is then subjected to curing conditions effective to react the reactive functional groups of the diluent. If the preformed acrylate polymer contains reactive moieties (e.g., hydroxy or carboxyl moieties) which will react with reactive groups on the diluent or with the ring-opened diluent during the curing step, then a graft polymer will be formed comprised of the preformed acrylate polymer having attached thereto the residual product of the reacted diluent step. Alternatively, an interpenetrating polymer network or polymer blend will be formed in the event that the preformed acrylate polymer does not provide the necessary reaction sites on the polymer for reaction with reactive functional end groups which reside on the diluent. Conventional crosslinking agents can also be added to the reactants to yield a crosslinked product.

The at least one diluent which is employed in the method of the present invention is selected from the group consisting of:
(a) a ring-opening monomer diluent producing a polymer having a $T_g<20°$ C., and
(b) mixtures of said ring-opening monomer diluent and a multifunctional liquid polymer having a $T_g<20°$ C.

The multifunctional liquid polymer diluent has a $Tg<20°$ C. and is essentially non-reactive with the other reactants under conditions of free radical polymerization employed, is compatible with and serves as a reaction diluent for the reactants, and has reactive end groups which are capable of reaction subsequent to formation of the acrylate polymer during the curing step. The multifunctional liquid polymer may be, e.g., di- or trifunctional.

By way of example, one class of suitable liquid difunctional polymer diluents is silyl-terminated polyethers. This class of diluents comprises a polyether having at least one reactive silicon-containing group represented by the formula:

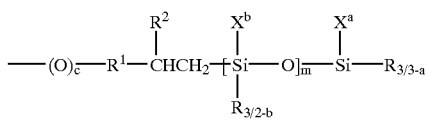

wherein $R^1$ is a bivalent organic group having from 1 to 20 carbon atoms, $R^2$ is hydrogen or a monovalent organic group having 1 to 20 carbon atoms, $R^3$ is monovalent hydrocarbon group or a triorganosiloxy group, a is 0–3, b is 0–2, c is 0 or 1, with the proviso that 1 a+b 4, X is a silanol group or a hydrolyzable group, and m is 0–18.

The polyether to which the silyl termination is attached may be defined by the formula —$R^4O$— where $R^4$ is a bivalent organic group, preferably having from 1 to 8 carbon atoms. Exemplary $R^4$ moieties include but are not limited to —$CH_2$—, —$CH_2CH_2$—, —$CH(CH_3)CH_2$—, $CH(C_2H_5)CH_2$—, —$C(CH_3)_2CH_2$—, —$CH_2CH_2CH_2CH_2$—, etc. Preferably, the polyether includes from 20 to 1000 repeat ether units.

The molecular weight of the polyether diluent will generally range from 500 to 100,000, and preferably from 3,000 to 50,000. Silyl-terminated polyethers are disclosed is U.S. Pat. No. 4,593,068, herein incorporated by reference.

An additional class of diluent that my be employed in the present invention is a ring-opening monomerdiluent. Such a diluent is also non-reactive with the other reactants under conditions of free radical polymerization employed and which is capable of undergoing ring opening subsequent to formation of the acrylate polymer during the curing step. Such ring-opening diluents comprise, without limitation, lactones, lactams, cyclic ethers and cyclic siloxanes represented by the following general formulae, respectively:

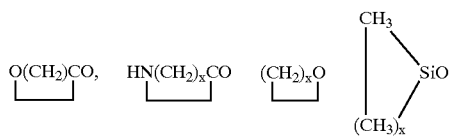

wherein x ranges from, for example, 3 to 11, and preferably 3–6 alkylene groups. A description of acceptable diluents resides in U.S. Pat. No. 5,082,922, herein incorporated by reference.

U.S. Pat. No. 5,082,922 teaches the use of ring-opening monomers as diluents in the solvent-free formation of polymers from ethylenically unsaturated monomers. However, this patent teaches a single step reaction of the monomers together with the ring-opened diluent. This differs from the two step method of the present invention which provides for the initial formation of the polymer from ethylenically unsaturated monomers followed by curing of the diluent in the presence of the thus-formed polymer. The patent provides for use of reaction conditions such as temperatures of at least 150° C. which support both reactions in a single step.

Preferred ring-opening monomer diluents include but are not limited to butyrolactone, valerolactone, caprolactone, methy-butyrolactone, butyrolactam, valerolactam and caprolactam.

While the polymerization reaction may be carried out in the presence of a non-reactive solvent, the reaction can advantageously occur in the substantial absence of a solvent. Preferably, the solvent will be present in an amount of up to about 10 percent by weight, and preferably no more than 5 percent by weight, based on the total weight of the reactants. The solvent may be removed from the product of the diluent reaction step (such as by heating). Exemplary non-reactive solvents include ketones, alcohols, esters and hydrocarbon solvents, such as ethyl acetate, toluene and xylene.

The requisite ring-opening step may occur, for example, by feeding the preformed acrylate-based polymer together with the diluent to suitable extrusion means such as a counter-rotating twin screw extruder under curing conditions. Such an extruder is disclosed in U.S. Pat. Nos. 4,619,979 and 4,843,134, each herein incorporated by reference. Exemplary extrusion conditions include a temperature within the range of from ambient to 250° C. It is possible to form the acrylate polymer in the presence of a single diluent with the diluent/polymer mixture being subjected to curing conditions in an extruder. A second diluent may be added further downstream in the extruder to the cured mixture which is then also subject to curing conditions.

Alternatively, the preformed acrylate polymer in conjunction with the diluent may be coated onto a web and cured under suitable conditions. The weight ratio of the acrylate polymer reactants to the diluent ranges from about 90:10 to about 10:90.

If it is desired to produce a product having film-like properties, the Tg of the resultant material should be $>20°$ C.

If it is desired to produce a product having pressure sensitive adhesive properties, the Tg of the resultant material should be <20° C.

If the resultant material exhibits pressure sensitive adhesive properties it may accordingly be used in association with a variety of body members (e.g., tapes, patches, strips, labels, etc.) to provide an adhesive assembly. For example, the body member may be in the form of a backing material coated on at least one side thereof with the adhesive to provide an adhesive-backed sheet film or tape. Exemplary backing materials used in the production of such a product include but are not limited to flexible and inflexible backing materials conventionally employed in the area of pressure sensitive adhesives, such as creped paper, kraft paper, fabrics (knits, non-wovens, wovens), foil and synthetic polymer films such as polyethylene, polypropylene, polyvinyl chloride, poly(ethylene terephthalate) and cellulose acetate, as well as glass, ceramics, metallized polymer films and other compatible sheet or tape materials.

When the composition exhibits pressure sensitive adhesive properties, the composition may be used with particular advantage as a transdermal adhesive in association with a percutaneous penetration enhancer in a transdermal drug delivery device particularly when the acrylate polymer includes at least one of graft moieties C and D. Such devices may take many forms. Generally, such devices comprise a backing material and an adhesive layer on at least a portion of the backing material. A release liner covers the adhesive layer until use at which time the liner is removed and the adhesive layer placed on the skin. The backing material is impermeable to the pharmacologically active agent. The pharmacologically active agent may be contained in either a liquid reservoir within the backing layer, within a matrix layer on said backing layer disposed between the adhesive layer and the backing layer, or within a layer of the drug flux enhancer-adhesive composition. The manner of formulation of such various transdermal drug delivery systems is within the ability of one skilled in the art.

Percutaneous penetration enhancers have the ability to increase permeability of skin to transdermally-administered pharmacologically active agents. Such enhancers are well-known in the art, and are discussed at length in U.S. Pat. Nos. 5,059,426 and 5,175,052, each herein incorporated by reference. By way of brief summary, such enhancers include but are not limited to surfactants (anionic, nonionic, cationic, zwitterionic), lipophilic solvents (terpenes, lactams), hydrophilic solvents (polyols, fatty acid esters, alcohols, sulfoxides), etc. Preferably, such enhancers are selected from the group consisting of sorbitols, ethoxylated alkyl phenols, glycerol, propylene glycol, polyethylene glycols, fatty acid esters, alcohols, and amines, and may be either water-soluble or non-water-soluble (i.e., oily).

The present invention is exemplified in the following examples which are intended to be explanatory in nature and not limiting in scope of the present invention.

EXAMPLE 1

A reactor is heated to 175–180° F. and purged with nitrogen. A diluent/catalyst reactor charge of caprolactone (120 grams), butyrolactone (120 grams) and VAZO 67 (8.0 grams) is mixed and heated to 175–180° F. over 15 minutes in the reactor. An additional mixture is formed of isooctylacrylate (477.40 grams), acrylic acid (39.20 grams), vinylpyrrolidone (19.60 grams)/vinyl caprolactam (19.60 grams) and caprolactone acrylate (4.20 grams). The additional mixture is incrementally added to the reactor over 5 hours, with the reaction continuing for at least 1.5 hours after completion of all reactants to yield an acrylate polymer composition in the diluent.

EXAMPLE 2

A reactor is heated to 1.75–180° F. and purged with. nitrogen. A diluent/catalyst reactor charge of caprolactone (206.40 grams) and VAZO 67 (6.88 grams) is mixed and heated to 170–175° F. An additional mixture is formed of isooctylacrylate (360 grams), acrylic acid (29.30 grams), and vinyl pyrrolidone (14.65 grams)/vinyl caprolactam (14.65 grams). The additional mixture is incrementally added to the reactor over 4 hours, with the reaction continuing for at least 1.5 hours after addition of all reactants to yield an acrylate polymer composition in the diluent.

EXAMPLE 3

200 grams of the product of the reaction of Example 1 (140 grams of the acrylate polymer composition in 60 grams diluent) is admixed with 1.0% methane sulfonic acid and 0.2% diethylene glycol. The admixture is coated on a liner, covered by a liner, and cured at 240° F. for five minutes and then cured at 300–325° F. for 10 minutes.

What is claimed is:

1. A method for the production of an acrylate polymer in the presence of a liquid diluent comprising the steps of:
    (1) providing a reaction mixture of at least one A monomer consisting of a monomeric (meth)acrylic acid ester of a non-tertiary alcohol having from 1 to 30 carbon atoms, optionally at least one B monomer different from said A monomer, optionally at least one polymeric graft moiety C having a $T_g$ greater than 20 C, optionally at least one graft macromer D containing repeat hydrophilic units, and at least one liquid diluent which is non-reactive under conditions of free-radical polymerization;
    (2) forming an acrylate polymer in the presence of said at least one diluent by reaction of component A, and any components B, C and/or D present in said reaction mixture under conditions of free radical polymerization whereby said at least one diluent is non-reactive; and
    (3) subsequently curing said diluent, and
    wherein said diluent is selected from the group consisting of:
        (a) a ring-opening monomer diluent producing a polymer having a $T_g$<20° C., and
        (b) mixtures of said ring-opening monomer diluent and a multifunctional liquid polymer having a $T_g$<20° C.

2. The method of claim 1 wherein the weight ratio of components A, B, C and D to diluent in step (1) ranges from about 90:10 to about 10:90.

3. The method of claim 1 wherein a graft moiety C is present which is a polymerized monoalkenyl-substituted aromatic hydrocarbon.

4. The method of claim 3 wherein said polymerized monoalkenyl-substituted aromatic hydrocarbon comprises polystyrene.

5. The method of claim 1 wherein the molecular weight of said graft moiety C is in the range of from about 2,000 to 30,000.

6. The method of claim 1 wherein said at at one A monomer comprises an ester of (meth)acrylic acid with a non-tertiary alcohol selected from the group consisting of 1-butanol, 1-pentanol, 2-pentanol, 3-pentanol, 2-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, and 1-dodecanol.

7. The method of claim 1 wherein the A monomer is present in the acrylate polymer in an amount within the range of from about 20 to 80 percent by weight.

8. The method of claim 1 wherein the B monomer is present in the acrylate polymer in an amount within the range of from about 3 to 30 percent by weight.

9. The method of claim 1 wherein a D macromer is present in the acrylate polymer in an amount within the range of from about 5 to 60 percent by weight.

10. The method of claim 1 wherein a B monomer is present in the acrylate polymer which is selected from the group consisting of hydroxy($C_{1-5}$)alkyl (meth)acrylates, dihydroxy($C_{1-5}$)alkyl (meth)acrylates and mixtures thereof.

11. The method of claim 1 wherein a B monomer is present in the acrylate polymer which is a vinyl monomer having at least one nitrogen atom.

12. The method of claim 11 wherein said B monomer is selected from the group consisting of (meth)acrylamide, N-methylacrylamide, N-ethylacrylamide, N-methylolacrylamide, N-hydroxyethylacrylamide, diacetone acrylamide, N,N-dimethylacrylamide, N,N-diethylacrylamide, N-ethyl-N-aminoethyl acrylamide, N-ethyl-N-hydroxyethylacrylamide, N,N-dimethylolacrylamide, N,N-dihydroxyethylacrylamide and mixtures thereof.

13. The method of claim 1 wherein a macromer D is present defined by the formula X—(Y)$_p$—Z—R, wherein X is a moiety copolymerizable with monomers A and B or capable of attachment to copolymerized monomers A and B, Y is a divalent linking group, Z is a homo- or copolymeric moiety containing repeat hydrophilic units R is a terminal group, and p is 0 or 1.

14. The method of claim 13 wherein X is a (meth)acrylate moiety.

15. The method of claim 1 wherein a macromer D is present comprising a polyether or polyester (meth)acrylate moiety.

16. The method of claim 13 wherein Z is selected from the group consisting of a polyalkylene oxide radical, a polyethyloxazoline radical, a polyacrylic acid radical, a polyvinyl alcohol radical, a polyvinylpyrrolidone radical, a polyvinylcaproylactam radical and a polymethylvinyl ether radical.

17. The method of claim 1 wherein a macromer D is present defined by the formula:

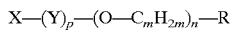

wherein X is a moiety copolymerizable with monomers A and B or capable of attachment to copolymerized monomers A and B, Y is a divalent linking group, R is a terminal group, m is an integer of from 2 to 6, n is an integer of up to 300, and p is 0 or 1.

18. The method of claim 17 wherein said macromer D is defined by the formula

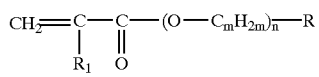

wherein $R_1$ is hydrogen or $C_{1-5}$ alkyl and R is a terminal group.

19. The method of claim 18 wherein R is OH or $C_{1-5}$ alkyl.

20. The method of claim 1 wherein said A monomer comprises a monomeric (meth)acrylic acid ester of a non-tertiary alcohol which has from 12 to 18 carbon atoms.

21. The method of claim 1 wherein a macromer D is present selected from the group consisting of ethoxylated hydroxy ($C_{1-5}$ alkyl) (meth)acrylate and propoxylated hydroxy ($C_{1-5}$ alkyl) (meth)acrylate.

22. The method of claim 1 wherein a macromer D is present selected from the group consisting of ethoxylated and propoxylated hydroxy ($C_{1-5}$ alkyl) (meth)acrylate, poly (2-ethyl-2-oxazoline), polyacrylic acid, polyvinyl alcohol, polyvinyl pyrrolidone, polyvinyl caprolactam and polymethylvinyl ether mono(meth)acrylate.

23. The method of claim 1 wherein a macromer D is present defined by the formula:

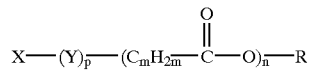

wherein X is a moiety copolymerizable with monomers A and B or capable of attachment to copolymerized monomers A and B, Y is a divalent linking group, R is a terminal group, m is an integer of from 2 to 6, n is an integer of up to 300, and p is 0 or 1.

24. The method of claim 23 wherein R is OH or $C_{1-5}$ alkyl.

25. The method of claim 1 wherein said ring-opening diluent is selected from the group consisting of lactones, lactams, cyclic ethers and cyclic siloxanes.

26. The method of claim 25 wherein said ring-opening diluent is selected from the group consisting of butyrolactone, valerolactone, caprolactone, methyl butyrolactone, butyrolactam, valerolactam, caprolactam and mixtures thereof.

27. The method of claim 1 wherein said liquid polymer diluent is a silyl-terminated polyether.

28. The method of claim 1 wherein said resulting product of step (3) is admixed with an additional diluent selected from the group consisting of a multifunctional liquid polymer having a $T_g<20°$ C. and a ring-opening monomer diluent producing a polymer having a $T_g<20°$ C. and the resulting admixture subjected to conditions effective to cure said additional diluent.

29. The method of claim 1 wherein the product of step (2) is fed to an extruder wherein step (3) occurs.

30. The method of claim 29 wherein an additional diluent selected from the group consisting of a multifunctional liquid polymer having a $T_g<20°$ C. and a ring-opening monomer producing a polymer having a $T_g<20°$ C. is added to the product of step (2) in said extruder.

31. The method of claim 1 wherein the product of step (2) is formed into a film and the film subjected to curing conditions.

* * * * *